(12) United States Patent
Brunel

(10) Patent No.: US 11,047,275 B2
(45) Date of Patent: Jun. 29, 2021

(54) EXHAUST GAS TREATMENT DEVICE, EXHAUST LINE AND METHOD OF MANUFACTURE

(71) Applicant: FAURECIA SYSTEMES D'ECHAPPEMENT, Nanterre (FR)

(72) Inventor: Jean-Paul Brunel, Meslieres (FR)

(73) Assignee: FAURECIA SYSTEMES D'ECHAPPEMENT

( * ) Notice: Subject to any disclaimer, the term of this patent is extended or adjusted under 35 U.S.C. 154(b) by 62 days.

(21) Appl. No.: 16/481,677

(22) PCT Filed: Jan. 26, 2018

(86) PCT No.: PCT/EP2018/051921
§ 371 (c)(1),
(2) Date: Nov. 18, 2019

(87) PCT Pub. No.: WO2018/138242
PCT Pub. Date: Aug. 2, 2018

(65) Prior Publication Data
US 2020/0095960 A1    Mar. 26, 2020

(30) Foreign Application Priority Data
Jan. 27, 2017   (FR) ...................................... 1750695

(51) Int. Cl.
*F01N 3/02*      (2006.01)
*F02M 26/35*   (2016.01)

(52) U.S. Cl.
CPC .............. *F01N 3/0205* (2013.01); *F01N 3/02* (2013.01); *F01N 2240/02* (2013.01);
(Continued)

(58) Field of Classification Search
CPC .............. F01N 3/0205; F01N 2240/02; F01N 2240/20; F01N 2240/36; F01N 2260/024;
(Continued)

(56) References Cited

U.S. PATENT DOCUMENTS 6,330,910 B1   12/2001 Bennett
2010/0043413 A1   2/2010 Orihashi et al.
(Continued)

FOREIGN PATENT DOCUMENTS

CN   104514598 A   4/2015
CN   205618224 U   10/2016
(Continued)

OTHER PUBLICATIONS

International Research Report for PCT/EP2018/051921 dated Feb. 20, 2018.

*Primary Examiner* — Jonathan R Matthias
(74) *Attorney, Agent, or Firm* — Carlson, Gaskey & Olds, P.C.

(57) ABSTRACT

A device for treating exhaust gases includes at least one purification member with a substrate for purifying the exhaust gases, a heat exchanger axially located beyond an axial end of the substrate, a body, a valve comprising a flap arranged in an internal volume of the body. An exchanger inlet and exchanger outlet open into the internal volume. At least 45% of a volume of the body is in a virtual space located in an axial extension of one or more purification substrate(s). The body comprises at least one first orifice in fluid communication with a purification member outlet, and a second orifice defining an outlet for the exhaust gases.

14 Claims, 10 Drawing Sheets

(52) U.S. Cl.
CPC ...... *F01N 2240/36* (2013.01); *F01N 2410/00* (2013.01); *F02M 26/35* (2016.02)

(58) Field of Classification Search
CPC .... F01N 2410/00; F02M 26/25; F02M 26/26; F02M 26/35
See application file for complete search history.

(56) References Cited

U.S. PATENT DOCUMENTS

| | | | |
|---|---|---|---|
| 2015/0308388 A1* | 10/2015 | Castano Gonzalez | ............... F02M 26/15 123/568.12 |
| 2016/0281580 A1* | 9/2016 | Tabares | ............... F02M 26/15 |
| 2018/0171940 A1* | 6/2018 | Gonz Lez | ............... F28F 27/02 |

FOREIGN PATENT DOCUMENTS

| | | |
|---|---|---|
| DE | 19817341 A1 | 11/1998 |
| EP | 3109428 A1 | 12/2019 |
| FR | 2859239 A1 | 3/2005 |
| FR | 2930296 A1 | 10/2009 |
| JP | 2016061194 A | 4/2016 |
| WO | 2007105815 A1 | 9/2007 |
| WO | 2012056179 A2 | 5/2012 |
| WO | 2018138242 A1 | 8/2018 |

* cited by examiner

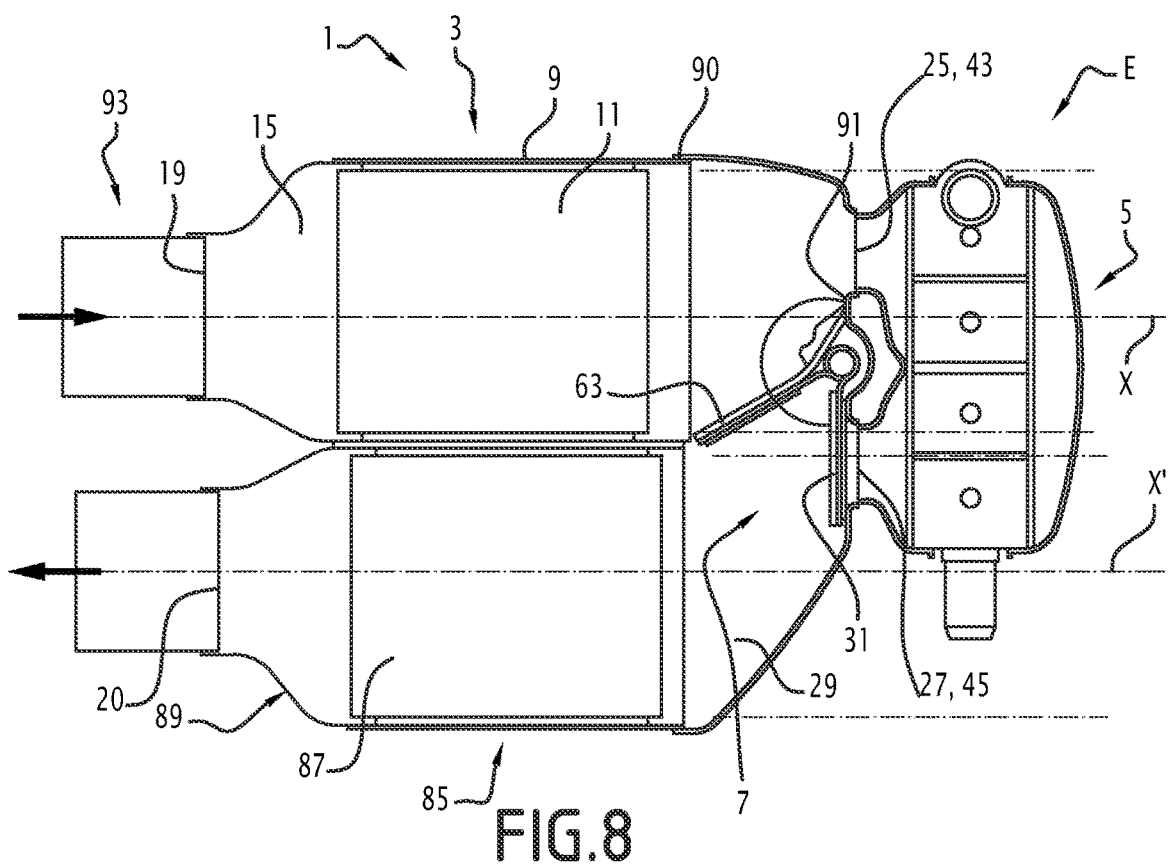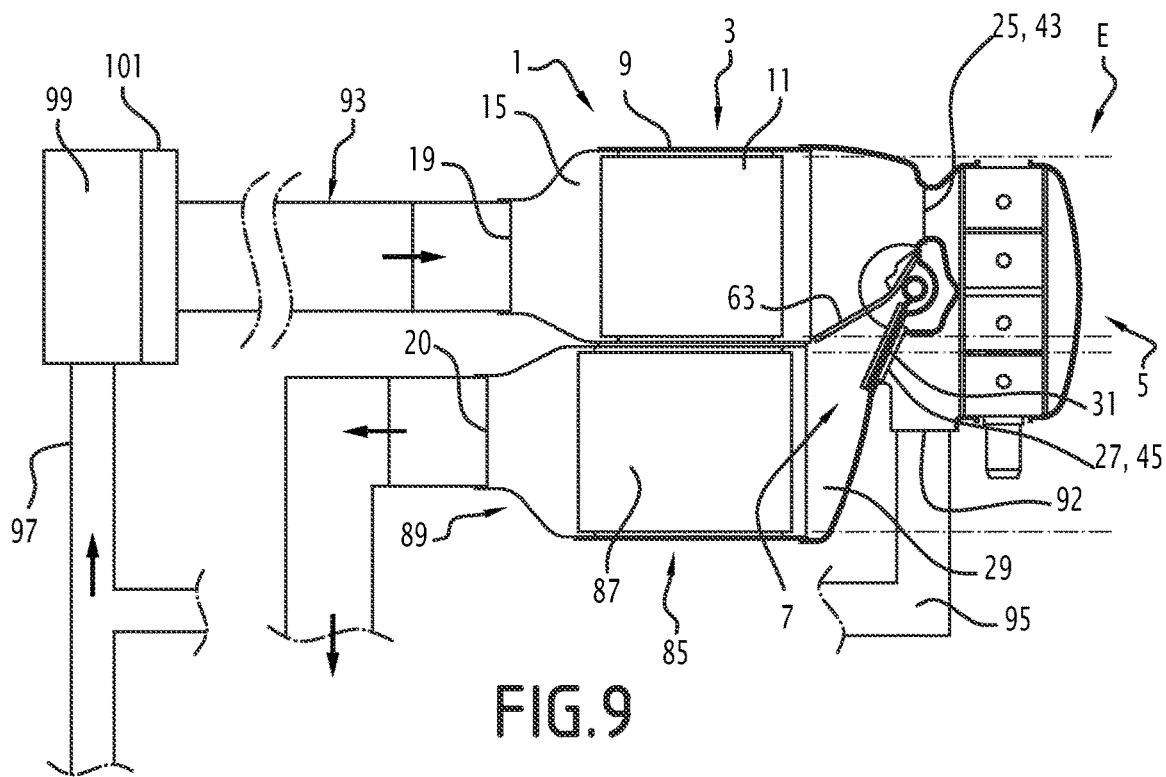

EXHAUST GAS TREATMENT DEVICE, EXHAUST LINE AND METHOD OF MANUFACTURE

CROSS-REFERENCE TO RELATED APPLICATIONS

This application is the US national phase of PCT/EP2018/051921, filed 26 Jan. 2018, and claims priority to FR 17 50695, filed 27 Jan. 2017.

FIELD OF INVENTION

The invention generally relates to devices for treating exhaust gases.

BACKGROUND OF THE INVENTION

A device for treating exhaust gases of a vehicle includes:
at least one exhaust gas purification member, the or each purification member including an outer enclosure, an exhaust gas purification substrate housed in the outer enclosure and having a central axis, the or at least one of the outer enclosures having a purification member outlet for the exhaust gases;
a heat exchanger including an exhaust gas circulation side provided with an exchanger inlet for the exhaust gases and an exchanger outlet for the exhaust gases, the heat exchanger being axially located beyond an axial end of the substrate of the or each purification member;
a body delimiting an inner volume; and
a valve including a flap arranged in the internal volume of the body and movable relative to the body.

EP 2,955,362 describes such a device. The purification member is closed on the downstream side by a cup in which two outlets are arranged for the exhaust gases. One of the outlets emerges in the valve body, and the other in the heat exchanger.

Such an arrangement allows the device for treating exhaust gases to be extremely compact. Conversely, stray losses are very high. This means that the movements of the exhaust gases in the heat exchanger remain significant even when the valve is in the short-circuit position and steers the exhaust gases into a passage path that bypasses the heat exchanger.

SUMMARY OF THE INVENTION

The invention aims to propose a device for treating exhaust gases that is compact, and in which the stray losses are decreased.

A device for treating exhaust gases of the aforementioned type includes
an exchanger inlet and exchanger outlet that open into the internal volume;
at least 45% of a volume of the body, preferably at least 55%, is in a virtual space located in an axial extension of the one or more purification substrate(s), the virtual space comprising, for the or each purification member, a cylinder coaxial to the central axis of the purification substrate of said purification member and having a straight section perpendicular to said central axis identical to an orthogonal projection of the purification substrate of said purification member in a plane perpendicular to said central axis;
the body includes at least one first orifice in fluid communication with the purification member outlet, and a second orifice defining an outlet for the exhaust gases.

Thus, the heat exchanger is supplied with exhaust gases only through the body. There is no longer any direct communication between the outlet of the purification member and the inlet of the heat exchanger for the exhaust gases.

The treatment device may further have one or more of the features below, considered individually or according to any technical possible combination(s):
the first orifice and the exchanger inlet extend in respective planes forming an angle relative to one another of between 30° and 120°;
the flap is movable at least between a short-circuit position in which the flap frees a direct passage for the exhaust gases from the first orifice to the second orifice without going through the heat exchanger, and a heat exchange position in which the flap closes off an opening and intersects the direct passage, the device comprising a flow guide delimiting a circulation channel for the exhaust gases from the first orifice toward the opening, preferably up to the opening;
the first orifice and the opening extend in respective planes forming an angle relative to one another of between 30° and 120°;
the opening is defined by a peripheral edge, the flow guide having a downstream end defining a downstream opening by which the exhaust gases leave the circulation channel, the downstream end being separated from the peripheral edge of the opening by a gap;
the downstream end, considered projected in a plane containing the opening, fits inside the opening, the projection being along a direction parallel to the plane in which the first orifice fits and contained in a plane perpendicular both to the first orifice and to the opening;
the flow guide has a passage section decreasing from the first orifice toward the opening;
the device has an indirect passage for the exhaust gases from the first orifice to the second orifice, passing through the heat exchanger, the direct passage and the indirect passage being superimposed along the or one of the central axes;
the first and second orifices extend in respective planes forming an angle relative to one another of between 30° and 120°;
at least 30% of a volume of the heat exchanger, preferably at least 45%, is in the virtual space;
the heat exchanger is housed in the internal volume of the body;
the heat exchanger is arranged outside the body, the body having third and fourth orifices in fluid communication with the exchanger inlet and with the exchanger outlet;
the flap is movable relative to the body around a rotation axis substantially perpendicular to the or each central axis.

According to a second aspect, the invention relates to a vehicle exhaust line, comprising:
a main line on which a treatment device is inserted having the above features;
a line for recycling exhaust gases toward an air intake of the engine;
the circulation side for the exhaust gases of the exchanger comprises an additional outlet in fluid communication with the recycling line.

According to a third aspect, the invention relates to a method for manufacturing a treatment device having the above features, the method comprising the following steps:

making, by calculation, a static pressure and/or speed map of the exhaust gases inside the body;

using the map, determining, at different points distributed on the walls of the flow guide, a difference between a static pressure on the internal side of the flow guide and a static pressure on the external side of the flow guide and/or a tangential speed of the exhaust gases on the internal side of the flow guide;

determining a variation interval of the pressure difference at said points and/or a variation interval of the tangential speed at said points;

making holes in the walls of the flow guide in zones where the pressure difference is in a lower half of the variation interval of the pressure difference and/or the tangential speed is in an upper half of the variation interval of the tangential speed.

BRIEF DESCRIPTION OF THE DRAWINGS

Other features and advantages of the invention will emerge from the detailed description given below, by way of indication and without limitation, with reference to the annexed figures, including:

FIGS. 7 to 9 illustrate a second and third embodiment of the invention;

DETAILED DESCRIPTION

Figure 1:
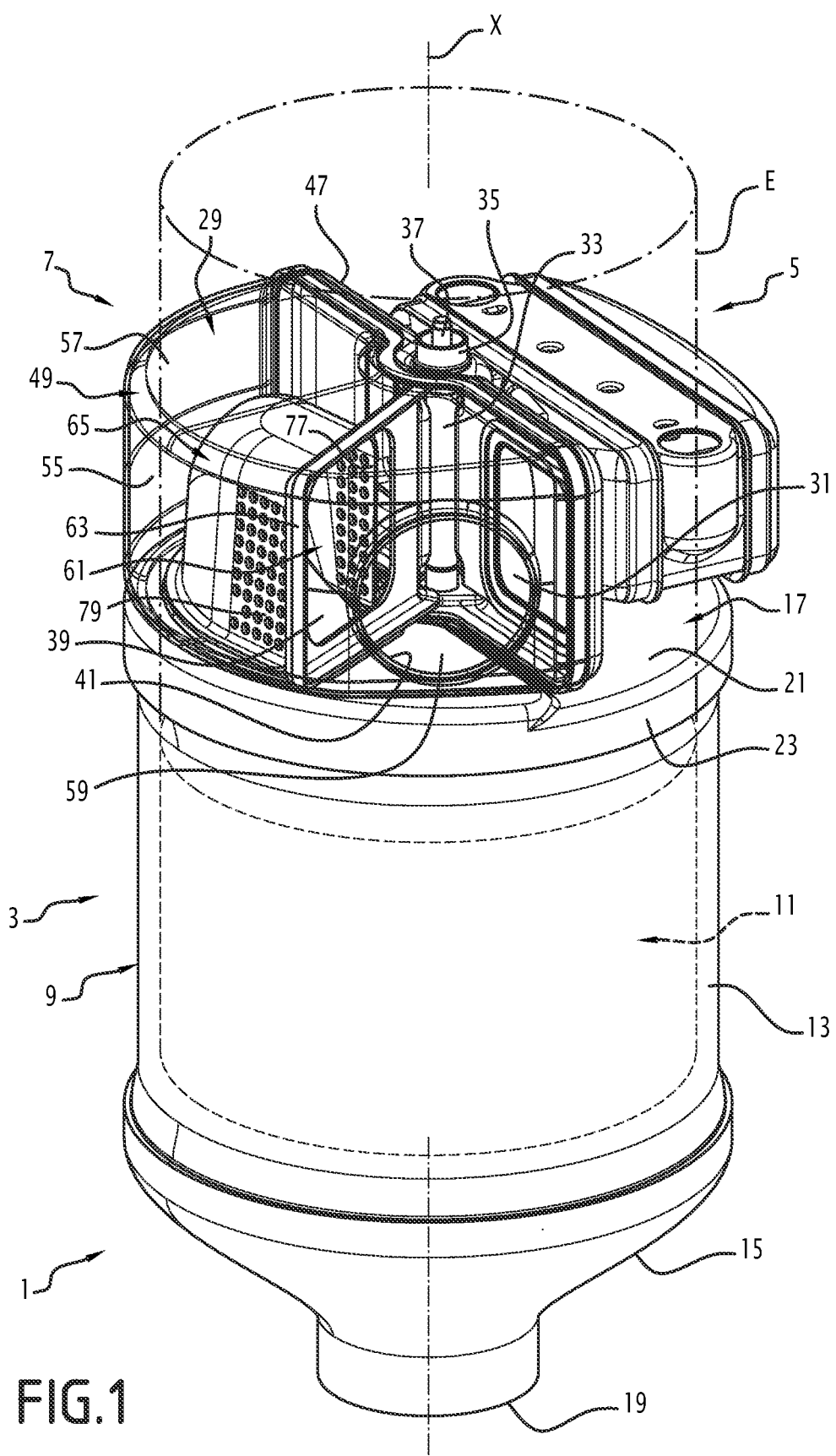
FIG. 1 is a perspective view of a treatment device according to a first embodiment of the invention, the body being shown transparent to leave the members located inside the latter visible.

The device for treating exhaust gases shown in FIG. 1 is intended to be inserted into the main line of a vehicle exhaust line.

The vehicle is typically a motor vehicle, for example a car or truck.

In the present application, upstream and downstream will be understood relative to the normal direction of the exhaust gases.

The treatment device 1 comprises at least one member for purifying exhaust gases 3, a heat exchanger 5, and a valve 7.

A first embodiment of the invention will now be described, in reference to FIGS. 1 to 6.

The treatment device 1 includes a single member for purifying exhaust gases. In a variant, the device includes two or more members for purifying exhaust gases.

The or each purification member 3 includes an outer enclosure 9, and at least one substrate 11 for purifying exhaust gases housed in the outer enclosure 9 and having a central axis X.

In the example shown in FIG. 1, the purification member has only one substrate 11. In a variant, the purification member 3 includes two purification substrates placed in series, or more than two substrates.

The or each substrate is typically a three-way catalyst (TWC), a particle filter, or an NOx trap, or a hydrocarbon and CO oxidation catalyst, or an NOx reduction catalyst, or a SCR (Selective Catalytic Reduction) catalyst, or an SCRF (Selective Catalytic Reduction Filter) member, etc.

The substrate 11 has any appropriate shape. The central axis X is generally parallel to the direction of flow of the exhaust gases within the purification member. It generally passes through the geometric center of each straight section of the substrate considered perpendicular to the direction of flow of the exhaust gases.

Typically, the outer enclosure 9 includes a tubular central part 13, an upstream end part 15 and a downstream end part 17. The central part 13 is typically substantially cylindrical, for example with a circular base. It is typically coaxial to the central axis X. The upstream and downstream end parts 15, 17 are attached on two opposite axial ends of the central part 13.

Figure 2:
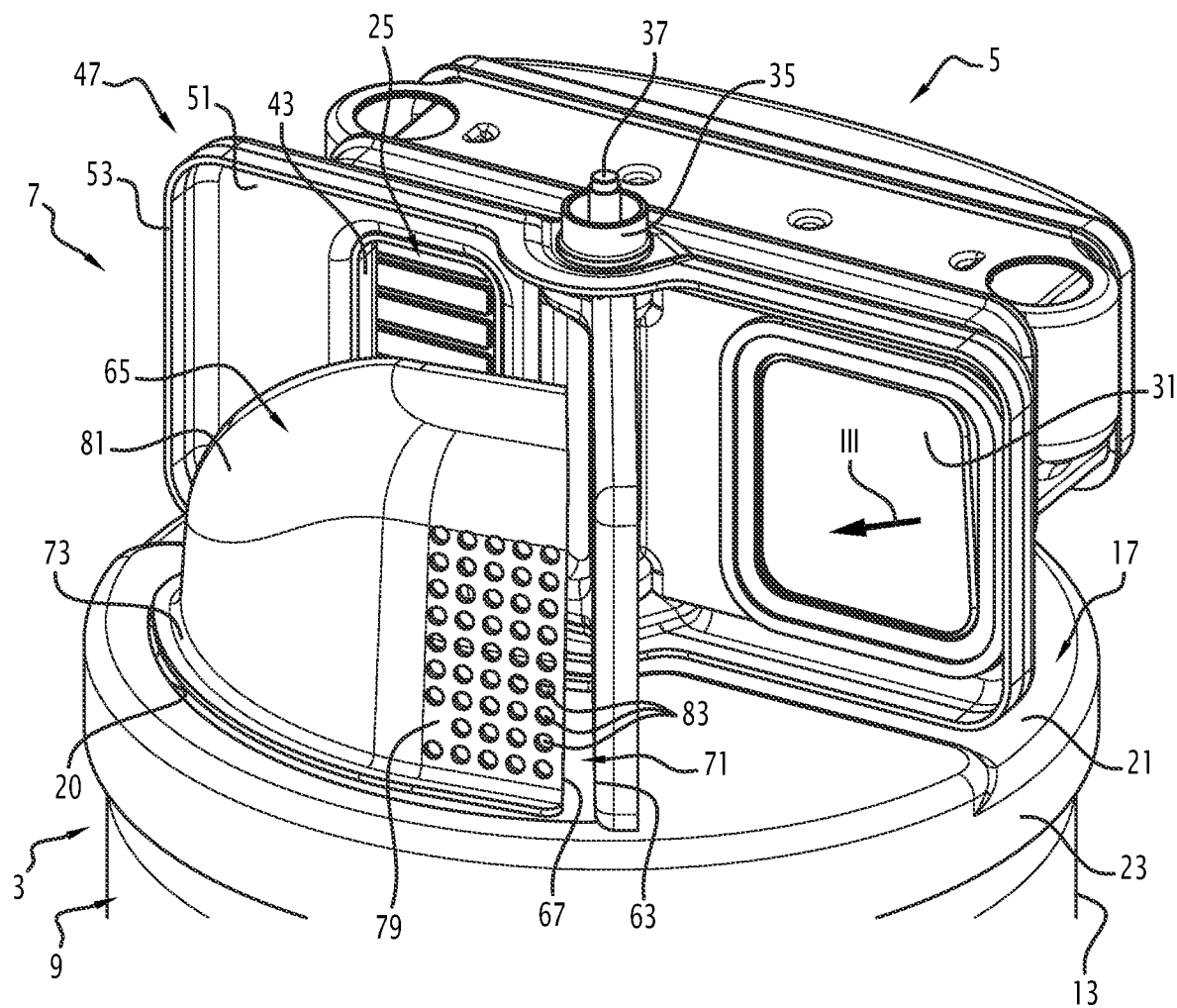
FIG. 2 is an enlarged perspective view of part of the device of FIG. 1, the flap being shown in the short-circuit position.

The outer enclosure 9 has a purification member inlet 19 and a purification member outlet 20 for the exhaust gases, visible in FIG. 2.

The inlet 19 is connected to an upstream part of the main line and communicates fluidly with a manifold capturing the exhaust gases leaving the engine.

In the illustrated example, the upstream end part 15 is a cone. It defines the purification member inlet 19 for the exhaust gases.

In the illustrated example, the downstream end part 17 is cup-shaped. It includes a bottom 21 and a flanged edge 23 extending over the entire periphery of the bottom 21. The bottom 21 is substantially perpendicular to the central axis X. The flange edge 23 is attached, and more specifically rigidly sealably fastened, on the central part 13 of the outer enclosure.

The outlet 20 is cut into the downstream end part 17, and more specifically into the bottom 21.

In other words, the outer enclosure 9 of the purification member is closed on the downstream side by a bottom 21, in which the purification member outlet 20 is arranged.

The heat exchanger 5 includes an exhaust gas circulation side and a heat transfer fluid circulation side, the exhaust gases ceding part of their heat energy to the heat transfer fluid while passing through the heat exchanger 5. The heat transfer fluid is provided, for example, to heat the coolant of the engine, or the passenger compartment of the vehicle, or any other circuit or member of the vehicle.

Figure 4:
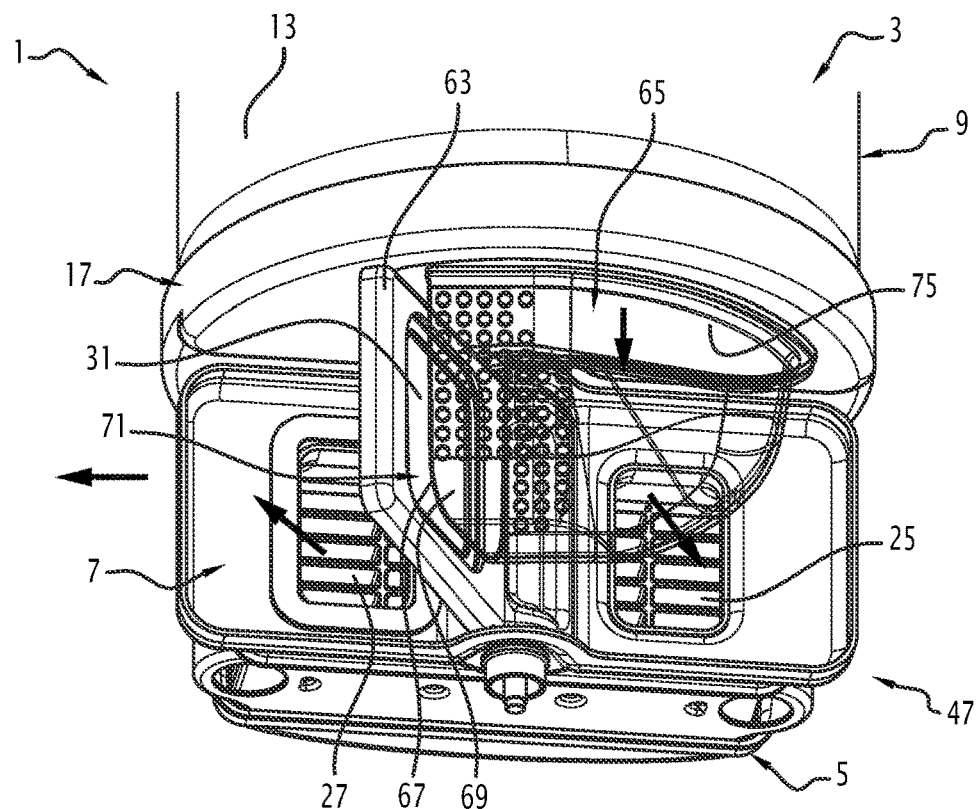
FIG. 4 is a perspective view of elements of FIG. 2, considered along another incidence, the flap being shown in the heat exchange position.

The exhaust gas circulation side is provided with an exchanger inlet 25 for the exhaust gases and an exchanger outlet 27 for the exhaust gases, which are for example visible in FIG. 4.

The heat exchanger 5 is located, in the axial direction, past an axial end of the or each purification member 3. This means that the heat exchanger 5 is completely placed, axially, on one side of the purification member(s).

The device 1 includes a body 29 delimiting an inner volume. The valve 7 includes a flap 31 arranged in the internal volume of the body 29 and movable relative to this body 29.

Typically, the body 29 is attached on the outer enclosure 9, and more specifically on the downstream end part 17.

Typically, the valve 7 includes a mechanism for driving the flap 31.

In the illustrated example, the flap 31 is rotatable relative to the body 29 around a rotation axis that here is combined with the central axis X.

In a variant, the rotation axis is not combined with the central axis X. According to another variant, the flap moves relative to the body 29 according to a movement that is not rotational.

Figure 3:
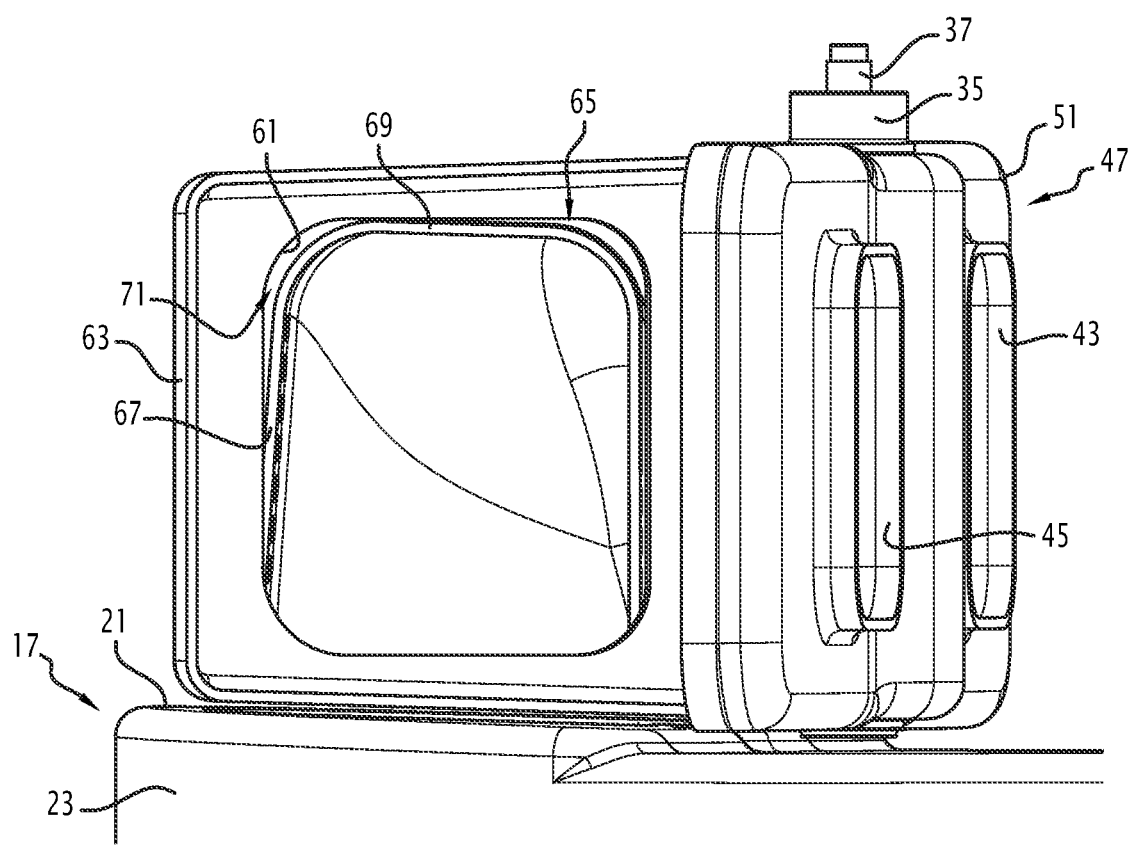
FIG. 3 is a perspective view of certain elements of FIG. 2, considered along the incidence of arrow III of FIG. 2.

In the illustrated example, the flap 31 is fastened to a tubular hub 33, mounted rotating around bearings 35, only one of the bearings being shown in FIGS. 1, 2 and 3. The drive mechanism typically includes an actuator, not shown, and a kinematic chain transmitting the rotating torque from the actuator to a rod 37 visible in FIGS. 1, 2 and 3. The rod 37 is secured in rotation with the hub 33.

At least 45% of a volume of the body 29 is in a virtual space E located in the axial extension of the purification substrate(s) 11.

The virtual space E is reflected in FIG. 1.

More specifically, for the or each purification member 3, the virtual space E comprises a cylinder coaxial to the central axis X of the purification substrate 11 of said purification member 3. This cylinder has a straight section, perpendicular to said central axis, identical to an orthogonal projection of the substrate 11 of said purification member over a plane perpendicular to said central axis X.

Thus, when the treatment device 1 includes only one purification member 3, the virtual space E comprises only one cylinder.

In the exemplary embodiment of FIG. 1, the orthogonal projection of the purification substrate 11 is substantially circular. In a variant, it could be elliptical, oval, or have any other shape, square, rectangular, etc.

As previously indicated, at least 45% of the volume of the body 29 is housed in the virtual space E, preferably at least 60%, still more preferably at least 75%, and even more preferably at least 90%.

In the example of FIG. 1, about 80% of the volume of the body 29 is housed in the virtual space E.

Likewise, at least 30% of the volume of the heat exchanger 5 is housed in the virtual space E, preferably at least 45%, still more preferably at least 60%, and even more preferably at least 90%.

The virtual space E axially has a limited length, less than twice the axial length of the purification member 3, preferably less than the axial length of the purification member, still more preferably less than 50% of the axial length of the purification member.

The body 29 includes at least one first orifice 39 in fluid communication with the purification member outlet 20. Furthermore, the body 29 has a second orifice 41, defining an outlet for the exhaust gases outside the internal volume of the body 29.

In the first embodiment, the heat exchanger 5 is located outside the body 29. The exchanger inlet 25 and the exchanger outlet 27 open into the internal volume of the body 29. The body 29 has third and fourth orifices 43, 45 in fluid communication respectively with the exchanger inlet 25 and the exchanger outlet 27.

Typically, as illustrated in the figures, the first orifice 39 is placed to coincide with the outlet 20. It then typically has substantially the same size and the same shape as the outlet 20, which it completely covers.

Likewise, typically, the third 43 and fourth 45 orifices are placed to coincide with the inlet 25 and the outlet 27. They thus have substantially the same size and the same shape as the inlet 25 and the outlet 27, as shown in FIGS. 2 to 4.

In a variant that is not shown, the first, third and fourth orifices are connected by pipe portions to the purification member outlet, the exchanger inlet and the exchanger outlet.

In the first embodiment, the second orifice 41 is connected to a downstream part of the main line, and is in fluid communication with a cannula by which these exhaust gases are released into the atmosphere.

According to one advantageous aspect of the invention, the first orifice 39 and the exchanger inlet 25 extend in respective planes forming an angle relative to one another of between 30° and 120°, preferably between 65° and 105°, and for example equal to 90°. Thus, the exhaust gases penetrating inside the body through the first orifice must change directions to penetrate inside the heat exchanger. This contributes to decreasing the stray losses in the heat exchanger.

Likewise, the exchanger outlet 27 is generally oriented in the same way as the exchanger inlet 25, and typically also forms an angle of between 30° and 120° with the first orifice.

In the first embodiment, the first orifice 39 and the second orifice 41 extend in respective planes that also form an angle relative to one another of between 30° and 120°, preferably between 65° and 105°, and for example equal to 90°. Thus, the body 29 is used to cause the exhaust gases to change directions, which is necessary in certain geometries of the exhaust line.

In the example of FIG. 1, the body 29 includes a base plate 47 and a lid 49 attached on the base plate 47. The third and fourth orifices 43, 45 are cut into the base plate 47. The base plate 47 includes a bottom 51 and an upright edge 53 on which the lid 49 is attached. The base plate 47 bears the bearings 35. The latter are arranged such that the rod 37 is positioned between the third and fourth orifices 43, 45.

In the illustrated example, the base plate 47 has a substantially rectangular shape.

In the illustrated example, the lid 49 generally has a semi-cylindrical shape.

It has a side wall 55, substantially coaxial to the central axis X, and extending over about 180° around the axis X. It also includes upper and lower semicircular walls 57, 59 secured to the side wall 55. The walls 55, 57 and 59 define a mouth between them with a shape corresponding to that of the upright edge 53, closed off by the base plate 47. The first orifice 39 is arranged in the lower wall 59, and the second orifice 41 in the side wall 55.

Typically, the lower wall 59 is pressed against the bottom 21 of the downstream part of the enclosure 9.

The flap 31 is movable at least between a short-circuit position shown in FIGS. 1 and 2 in which the flap 31 frees a direct passage for the exhaust gases from the first orifice 39 to the second orifice 41 without going through the heat exchanger, and a heat exchange position shown in FIG. 4, in which the flap 31 closes off an opening 61 located along the direct passage, and thus intersects the direct passage.

The device 1 also has an indirect passage for circulation of the exhaust gases from the first orifice 39 to the second orifice 41, passing through the heat exchanger 5. In the heat exchange position, the exhaust gases circulate in the indirect passage.

Typically, the flap 31 closes off one end of the heat exchanger 5 in the short-circuit position. Advantageously, the flap 31 closes off the outlet of the exchanger 27.

In the illustrated example, the valve 7 includes a frame 63 rigidly fastened in the internal volume of the body 29. The opening 61 is defined in the frame 63.

In the illustrated example, the frame 63 extends in a radial plane relative to the rotation axis of the flap 31. It extends substantially from the hub 33 to the side wall 55.

In the short-circuit position, the flap 31 closes off the fourth orifice 45. In the heat exchange position, the flap 31 closes off the opening 61, and is pressed against the frame 63.

The opening 61 and the first orifice 39 extend in respective planes forming an angle between them of between 30° and 120°, preferably between 45° and 105°. In the exemplary embodiment of FIGS. 1 to 6, the angle is 90°.

The treatment device 1 advantageously comprises a flow guide 65 delimiting a circulation channel for the exhaust gases from the first orifice 39 toward the opening 61, preferably up to the opening 61.

As shown in FIG. 2, the flow guide 65 has a downstream end 67, defining a downstream opening 69 by which the exhaust gases leave the circulation channel.

The downstream end 67 is separated from the peripheral edge of the opening 61, i.e., of the frame 63, by a gap 71. In other words, the downstream end 67 is located opposite and in the immediate vicinity of the peripheral edge of the opening 61. Conversely, the downstream end 67 is not in contact with the peripheral edge of the opening 61.

Furthermore, the downstream end 67, considered projected in a plane containing the opening 61, fits inside this opening 61. As shown in FIG. 3, at least 75% of the downstream end 67 fits inside the opening 61, preferably at least 90% of the downstream end 67. Considered here is a projection along a direction parallel to the plane in which the first orifice 39 fits, said direction being contained in a plane perpendicular both to the first orifice 39 and to the opening 61.

This makes it possible to prevent exhaust gas streams from being stopped by the frame, which would create a local overpressure in the gap 71. This local overpressure would lead to an increase of the exhaust gas flow rate toward the inlet of the exchanger, and therefore to an increase of the stray power.

The flow guide 65 also has an upstream end 73 defining an upstream opening 75 located opposite and in the immediate vicinity of the first orifice 39.

In the illustrated example, the upstream opening is slightly smaller than the first orifice. Thus, nearly all of the exhaust gases penetrating inside the body through the first orifice 39 are captured by the flow guide 65, then channeled to the downstream end 67.

The upstream opening 75 and downstream opening 69 here are substantially perpendicular to one another.

As shown in particular in FIG. 2, these openings open one into the other, in that they are not separated from one another by a material bridge. This makes the flow guide 65 easier to manufacture.

Each opening is thus defined by a U-shaped edge, the two U-shaped edges being substantially perpendicular to one another.

The flow guide 65 has a passage section for the exhaust gases decreasing from the first orifice 39 toward the opening 61, i.e., from upstream to downstream.

The flow guide 65 has an inner wall 77 and an outer wall 79, opposite one another. The inner wall 77 faces toward the base plate 47. The outer wall 79 faces toward the side wall 55. The walls 77 and 79 are connected to each other by a bowed wall 81. Each wall 77, 79 defines part of the edge of the upstream opening, part of the edge of the downstream opening. The bowed wall 81 extends over an angular sector of about 90°, from the upstream opening to the downstream opening. It is convex toward the inside of the channel, with a substantially U-shaped bottom.

The presence of the flow guide 65 contributes to reducing the stray losses, when the flap is in the short-circuit position. It also contributes to reducing the re-circulations inside the body and the back-pressure, in the short-circuit position of the flap.

The walls of the flow guide are pierced by holes 83. As explained later, and as illustrated in FIG. 6, these holes are positioned in zones where the pressure difference at the wall between the inner side of the flow guide and the outer side of the flow guide is small. In addition to this criterion, or in place of this criterion, the holes are made in zones of the walls where the speed of the exhaust gases is high (see FIG. 5). Here, the tangential speed is considered, i.e., the speed of the exhaust gases along the wall, parallel to this wall. The higher this speed is when the exhaust gases pass by the holes, the smaller the quantity of exhaust gases escaping through the holes will be when the flap is in the short-circuit position.

These selection criteria for the position of the holes 83 make it possible to reduce the stray flow.

In the illustrated example, the holes 83 are positioned in the inner wall 77 and in the outer wall 79 of the flow guide.

Figure 5:
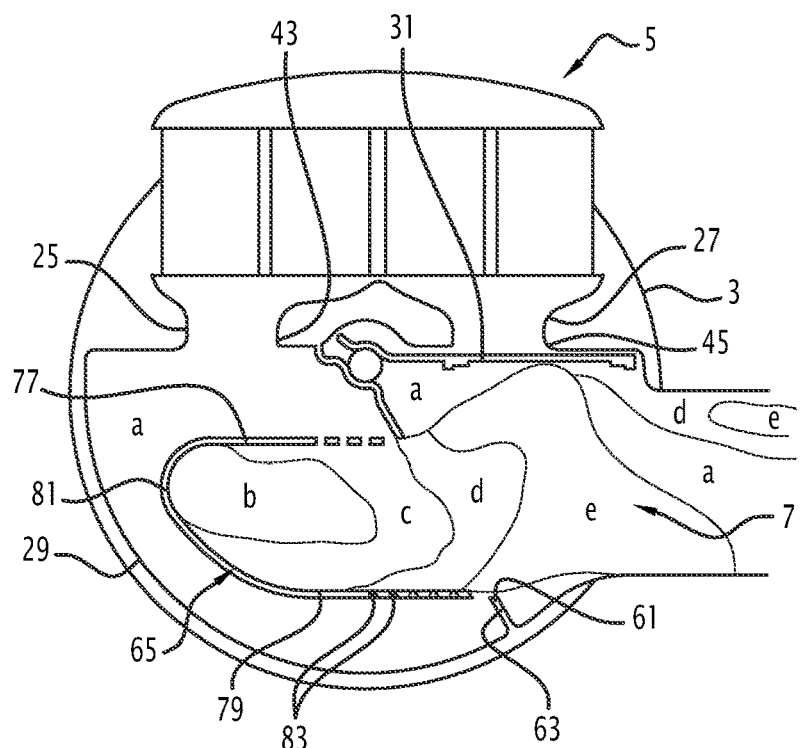
FIGS. 5 and 6 are simplified illustrations of the body, the flow guide and the heat exchanger, considered in a plane perpendicular to the axis of the purification member, respectively showing the result of calculations simulating speeds of the exhaust gases and exhaust gas pressures inside the body.
Figure 6:
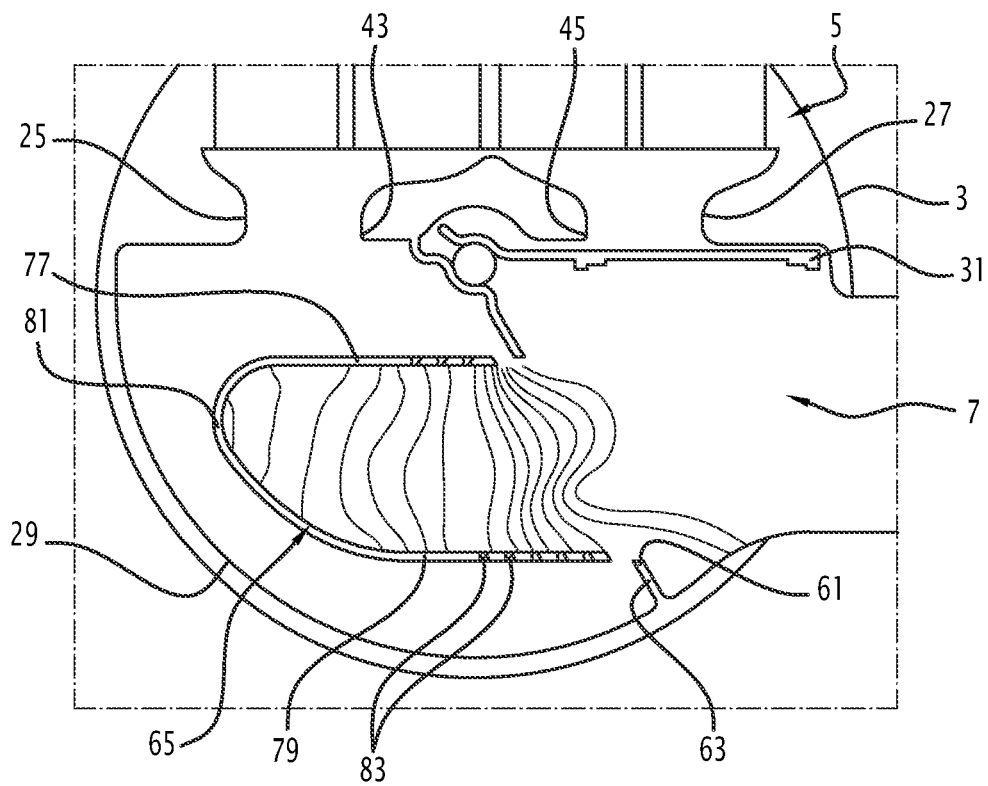

FIG. 5 illustrates the speeds of the exhaust gases inside the body.

The internal volume of the body has been divided into several zones referenced a to e, substantially corresponding to speed ranges for the exhaust gases. The speeds increase from a to e in that order, zone a being the lowest speed, and zone e being the highest speed.

One can see that the holes 83 are located in zones of the walls where the tangential speeds are high. The tangential speed is lowest at the bowed wall 81 and highest along the inner and outer walls 77, 79. It increases as one approaches the downstream end 67.

FIG. 6 shows the pressure level inside the flow guide. The pressure is substantially uniform outside the flow guide.

The inside of the flow guide has been divided into several zones referenced a to o, substantially corresponding to pressure ranges decreasing in that order. Zone a is the zone of highest pressure, zone o is the zone of lowest pressure.

One can see that the holes 83 are located in the zones where the pressure difference on either side of the walls of the flow guide is relatively low.

The pressure is greatest along the bowed wall 81 and weakest along the inner and outer walls 77, 79. It decreases as one approaches the downstream end 67 of the flow guide 65.

The operation of the purification device 1 will now be outlined.

The exhaust gases penetrate inside the purification member 3 through the inlet 19. After having passed through the or each substrate 11, the exhaust gases leave the purification member 3 through the outlet 20. They then penetrate inside the body 29 through the first orifice 39.

When the flap 31 is in the short-circuit position, the exhaust gases are steered by the flow guide 65 from the first orifice 39 up to the opening 61. They circulate inside the circulation channel They are captured completely by the upstream opening 75, and are deviated by the walls of the flow guide up to the downstream opening 69. Due to the arrangement of the downstream opening 69 of the flow guide relative to the opening 61, the head loss generated by the exhaust gases passing through the opening 61 is reduced. Likewise, due to the position of the holes 83 on the walls of the flow guide, only a small quantity of exhaust gas leaves the circulation channel by passing through the walls of the flow guide or by passing through the gap 71. This contributes to reducing the quantity of exhaust gases penetrating through the opening 25 into the heat exchanger.

The presence of the flow guide 65 in particular makes it possible to reduce the head losses related to the change of circulation direction of the exhaust gas flow when the latter goes from the outlet 20 of the purification member to the second orifice 41, and to reduce the quantity of exhaust gas penetrating through the inlet 25 into the heat exchanger (stray losses).

The shape of the outlet 20 has been chosen so as to maximize the inlet section in light of the packaging and weld connection constraints. The shape of the upstream end 73 has been chosen so as to create an inlet rack into the flow guide, making it possible to minimize the fluid stream contraction and therefore the head loss downstream.

In the heat exchange position, the flap 31 closes off the opening 61. As shown in FIG. 4, the exhaust gases follow the indirect passage. More specifically, the exhaust gases leaving the purification member 3 through the outlet 20 penetrate inside the body 29 through the first orifice 39. They are captured by the flow guide 65, and circulate along the circulation channel delimited by the flow guide. They leave the circulation channel through the gap 71 existing between the downstream end 67 of the flow guide and the opening 61. They also leave the flow guide through the holes 83. The presence of a gap 71 of sufficient width, and a sufficient number of holes 83, makes it possible to reduce the backpressure when the flap 21 is in the heat exchange position. After having left the circulation channel inside the flow guide 65, the exhaust gases follow the indirect passage. More specifically, the gases penetrate inside the heat exchanger 5 through the inlet 25, travel through the heat exchanger and return to the inside of the body 29 through the outlet 27. They then circulate up to the second orifice 41 inside the body.

It should be noted that in the first embodiment, the direct passage and the indirect passage are juxtaposed in a plane perpendicular to the central axis X.

A second embodiment of the invention will now be described, in reference to FIG. 7. Only the differences between this second embodiment and that of FIGS. 1 to 6 will be outlined below. Identical elements or elements performing the same function will be designated using the same references.

Figure 7:
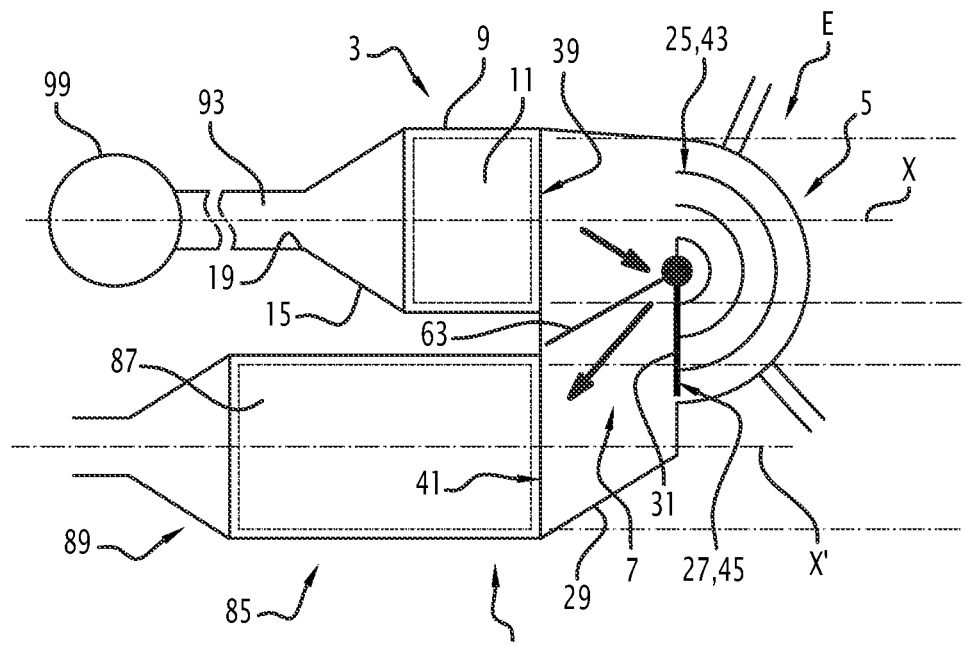
Figure 10:
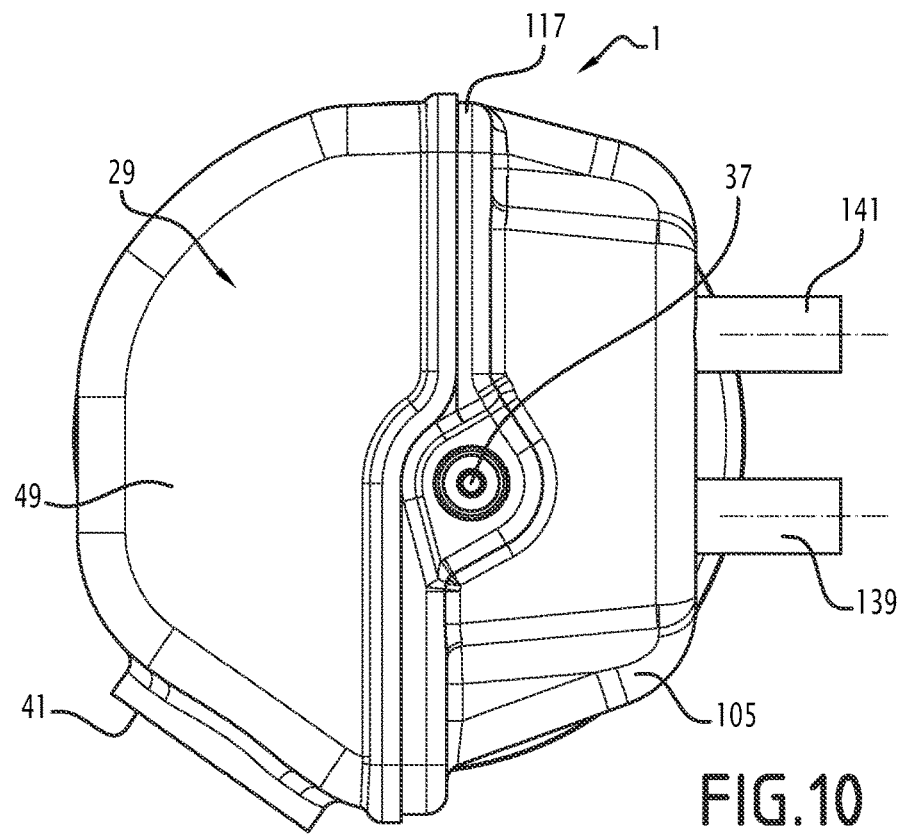
FIGS. 10 to 13 illustrate a fourth embodiment of the invention.

In the embodiment of FIG. 7, the purification device comprises two purification members. In addition to the purification member 3, the treatment device 1 comprises an additional purification member 85.

Typically, the purification member 3 includes a purification substrate 11 of the TWC (Three-Way Catalyst) type: HC, CO and NOx) or of the DOC (Diesel Oxidation Catalyst) type.

The additional purification member 85 in this case typically includes at least one purification substrate 85 of the GPF (Gasoline Particulate Filter) type, or CGPF (Coated GPF) type, or TWC, or DPF (Diesel Particulate Filter) type or SCR (Selective Catalytic Reduction) type, or SCRF (Selective Catalytic Reduction Filter) type, or a reduction catalyst (DeNOx).

The substrate 87 has a central axis X'.

The additional purification member 85 also includes an outer enclosure 89, the or each substrate 87 being housed inside the enclosure 89.

Typically, the axes X and X' are parallel to one another. In a variant, they form a non-nil angle relative to one another.

The purification members 3 and 85 are arranged side by side, in that their outer enclosures are arranged opposite one another. The outer enclosure 89 has a purification member inlet, not shown, fluidly communicating with the second orifice 41 of the body. Typically, the second orifice 41 and the purification member inlet are placed to coincide.

Such an architecture is known as U-shaped architecture.

Because the treatment device 1 includes several purification members, the virtual space E comprises several cylinders. The cylinders are typically separate volumes, separated by a gap. According to a variant that is not shown, the cylinders touch one another and together define a continuous virtual space.

In the exemplary embodiment of FIG. 7, the space E comprises two cylinders. The section of the space E depends on the shape of the substrate of each purification member.

If for example each purification substrate has a circular section, the virtual space E has a straight section made up of two circles, of identical sizes or different sizes, separated from one another.

If the purification substrates have a square section, the virtual space E is in the shape of two separate squares.

In such an architecture, part of the body 29 is located in the axial extension of the outer enclosure of the purification member 3, and another part of the body 29 is arranged in the axial extension of the additional purification member 85. Conversely, an intermediate part of the body 29 is not housed in the virtual space E, but in the space located between the two cylinders making up the virtual space E.

Advantageously, the body 29 makes up the volume making it possible to connect the outlet of the purification member 3 to the inlet of the additional purification member 85.

Such an embodiment is particularly compact.

In this embodiment, the third orifice 43 is not located in a plane perpendicular to the first orifice 39. It is rather located in a plane parallel to the first orifice, opposite the latter.

The fourth orifice 45 is located in a plane parallel to the third orifice 43.

The second orifice 41 is not located in a plane perpendicular to the first orifice. It is rather located in a plane substantially parallel to the first orifice 39.

A variant of the second embodiment of the invention will now be outlined, in reference to FIG. 8. Only the differences between this variant and FIG. 7 will be described below. Identical elements or elements performing the same functions will be designated using the same references.

FIG. 8 illustrates invariant of the treatment device that is particularly compact. In this variant, the outer enclosures 9 and 89 of the two purification members are separated from one another by an extremely small space.

Such an architecture of the two purification members is described in the patent application filed under number EP 15,305,613.0.

The body 29 defines a mouth 90 that adapts itself around the outer enclosures 9 and 89 of the two purification members. It has, opposite the mouth 90, a bottom 91 in which third and fourth orifices 43 and 45 are arranged.

The frame 63 extends from the bottom 91 toward the mouth 90. It divides the mouth 90 into two zones, along a line coinciding with the space separating the outer enclosures 9 and 89.

A third embodiment of the invention will now be described, in reference to FIG. 9.

Only the differences between this third embodiment and the second will be described below.

Identical elements or elements performing the same functions will be designated using the same references.

In this embodiment, the side of the heat exchanger provided for the circulation of the exhaust gases includes an additional outlet 92. This outlet 92 is tapped immediately upstream from the exchanger outlet 27. The outlet 92 is never closed off, irrespective of the position of the flap 31. Such a treatment device is provided to be integrated into an exhaust line of the type comprising:
  a main line 93 on which the treatment device 1 is inserted;
  a line for recycling 95 exhaust gases toward an air intake 97 of the engine 99, the additional outlet 92 being in fluid communication with the recycling line 95.

In the upstream direction, the main line 93 connects the treatment device 1 to an exhaust manifold 101 capturing the exhaust gases coming from the combustion chambers of the engine. In the downstream direction, the main line 93 connects the treatment device to a cannula, not shown, by which the exhaust gases, after purification, are released into the atmosphere.

The invention also relates to a method for manufacturing a treatment device 1 having the above features.

The method comprises at least the following steps:
  making, by calculation, a static pressure and/or speed map of the exhaust gases inside the body 29;
  using the map, determining, at different points distributed on the walls of the flow guide 65, a difference between a static pressure on the internal side of the flow guide and a static pressure on the external side of the flow guide and/or a tangential speed of the exhaust gases on the internal side of the flow guide;
  determining a variation interval of the static pressure difference at said points and/or a variation interval of the tangential speed at said points;
  making holes 83 in the walls of the flow guide 65 in zones where the pressure difference is in a lower half of the variation interval of the pressure difference and/or where the tangential speed is in an upper half of the variation interval of the tangential speed.

Thus, the position of the holes can be chosen by considering only the pressure differences on either side of the wall of the flow guide, or only the tangential speed of the exhaust gases at the wall of the flow guide, or considering both criteria at once.

The map is produced by calculation, considering one or several typical operating cases of the vehicle.

The variation interval of the pressure difference is bounded downwardly by the smallest pressure difference for all of the considered points, and upwardly by the greatest pressure difference for all of the considered points. Typically, points are considered distributed over all of the walls of the flow guide, in particular the walls 77, 79 and 81.

Likewise, the variation interval of the tangential speed is bounded downwardly by the lowest tangential speed for the considered points, and upwardly by the highest tangential speed for the considered points.

The holes are made where the pressure difference is in a lower half of the variation interval, preferably in a lower quarter of the variation interval. Likewise, the holes are preferably made in the zones where the tangential speed is in an upper half of the variation interval, preferably in an upper quarter of the variation interval.

The maximum number of holes are made in the zone where the static pressure difference is in the lower half of the interval.

A fourth embodiment of the invention will now be described in reference to FIGS. 10 to 13.

Only the differences between this fourth embodiment and the first will be outlined below. Identical elements or elements performing the same functions will be designated using the same references.

In the fourth embodiment, the base plate 47 of the body 29 is replaced by a cover 105. The cover 105 has a concave shape and is typically obtained by stamping.

The heat exchanger 5 is housed in the internal volume of the body 29, typically inside the cover 105.

The body 29 for example includes internal partitions 107, 109 arranged inside the cover 105 and rigidly fastened to the cover 105. The internal partitions 107, 109 divide the internal volume of the cover 105 (FIG. 11) into three chambers, hereinafter called inlet chamber 111, intermediate chamber 113 and outlet chamber 115. The heat exchanger 5 is placed in the intermediate chamber 113, which is defined between the internal partitions 107 and 109.

The exchanger inlet 25 is placed to coincide with an orifice cut into the internal partition 107. The exchanger inlet 27 is placed to coincide with an orifice cut into the internal partition 109.

The cover 105 has a free edge with closed contour 117, delimiting an opening 119. The free edge 117 has a shape corresponding to that of the mouth of the cover 49. It is sealably fastened to the mouth of the cover 49, for example by welding.

The inlet chamber 111 opens into the internal volume of the lid 49 through the opening 119, upstream from the opening 61.

The outlet chamber 115 also opens into the internal volume of the lid 49 through the opening 119, but downstream from the opening 61.

Figure 12:
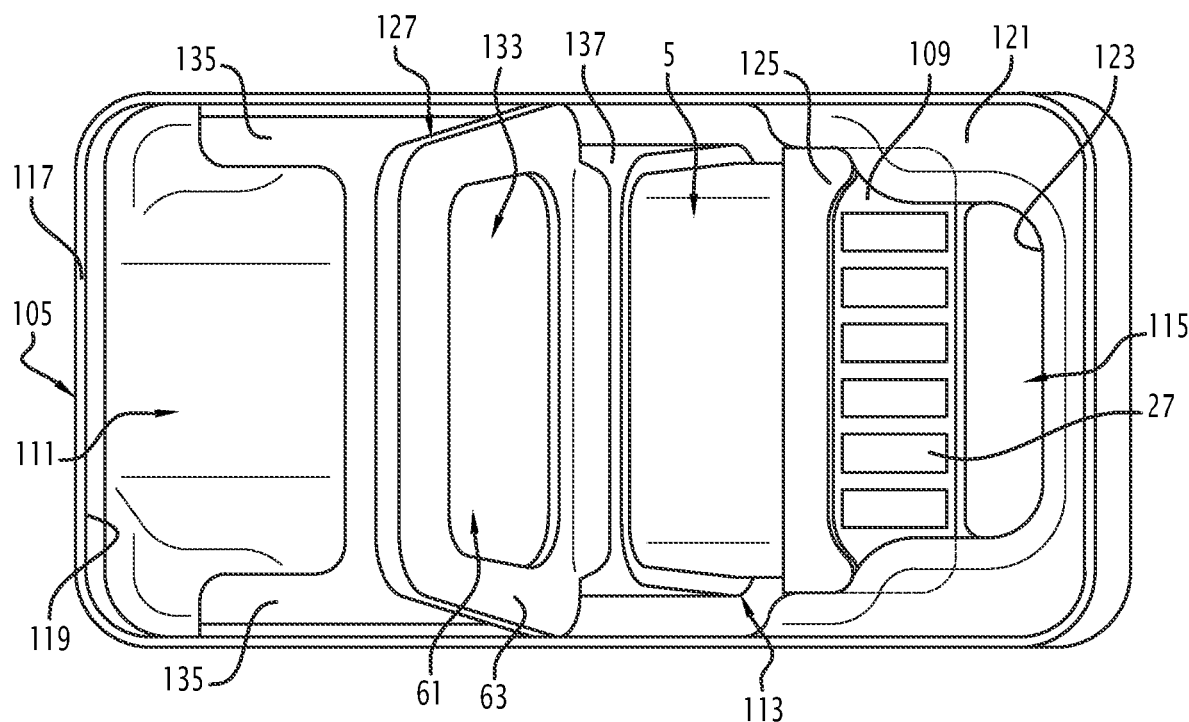

As shown more particularly in FIG. 12, the internal partition 109 defines, with a zone 121 of the cover 105, a cutoff orifice 123. In the short-circuit position, the flap 31 closes off the cutoff orifice 123. The outlet chamber 115 communicates with the internal volume of the lid 49 only through this cutoff orifice 123.

Figure 13:
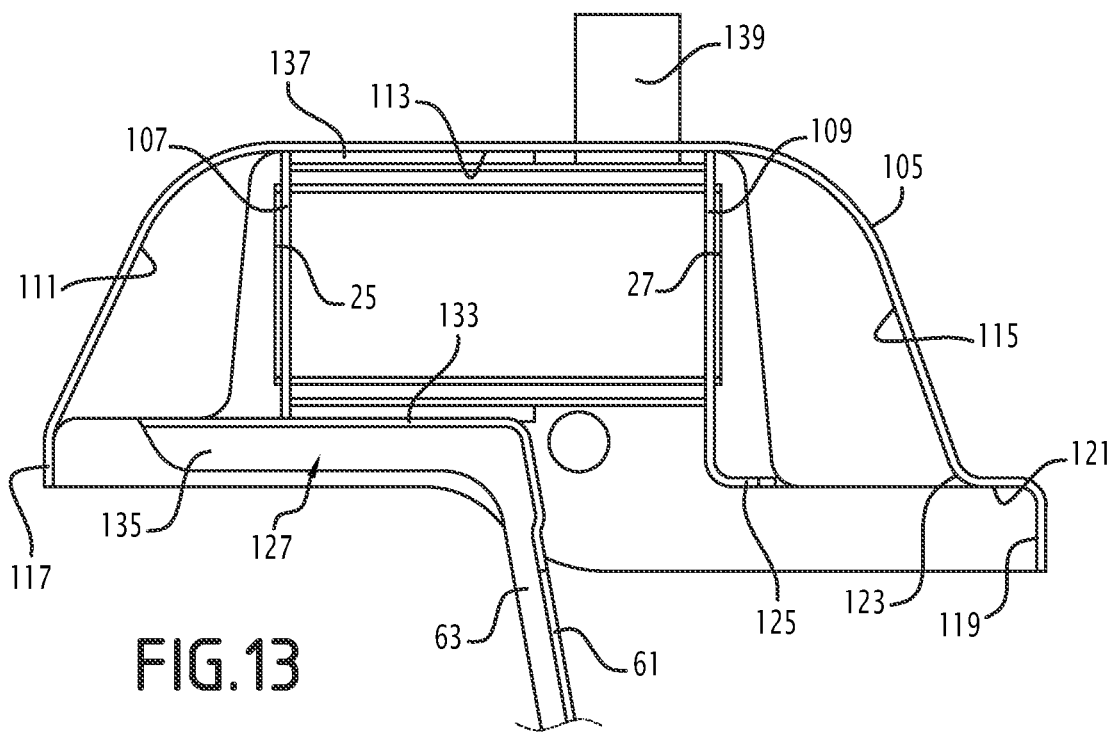

One can see in FIGS. 12 and 13 that an edge 125 of the internal partition 109 is bent so as to define, with the zone 121, a sealing step for the flap 31. The edge 125 and the zone 121 extend in a same plane, parallel to the axis X in the illustrated example.

Figure 11:
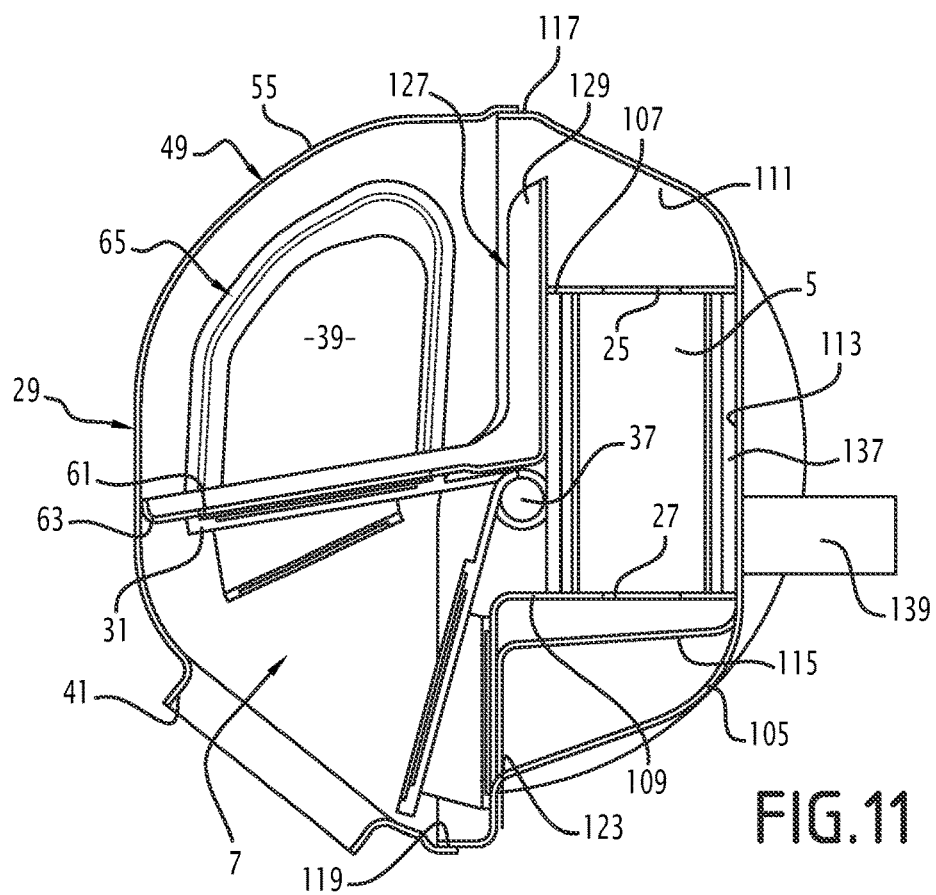

As shown in FIGS. 11 to 13, the body 29 includes a bracket part 127, the frame 63 making up one of the two faces of the bracket. The bracket 127 is rigidly fastened to the cover 105. The second face 129 of the bracket extends in the opening 119, in a plane substantially parallel to this opening 119. This plane contains or is parallel to the axis X. As visible in particular in FIG. 12, the face 129 includes a solid zone 133 extended by two arms 135. The solid zone 133 adjoins the joining ridge between the frame 63 and the face 129. The arms 135 extend the solid part 133 while moving away from the joining ridge, and extend along the free edge 117, on either side of the chamber 111.

The internal partition 107 is rigidly fastened to the solid part 133. Thus, the solid part 133 closes the intermediate chamber 113, substantially from the internal partition 107 up to the frame 63. The intermediate chamber 113 is only in fluid communication with the part of the internal volume of the lid 49 located downstream from the opening 61.

The two arms 135 are provided to allow rigid, sealed fastening of the face 129 to the cover 105, in particular along the edge 117.

As visible in particular in FIGS. 11 to 13, a web of a thermally insulating material is inserted between the heat exchanger 5 and the cover 105 or the solid wall 133. This web is referenced 137. Inlet and outlet tubes 139, 141 bring the heat transfer fluid to and discharge it from the exchanger 5. These tubes pass through the cover 105.

The circulation of the exhaust gases will now be described.

In the heat exchange position, the valve 31 closes off the opening 61. The exhaust gases penetrating inside the body 29 through the first orifice 39 travel through the circulation channel defined by the flow guide 65, and leave the latter through the gap 71 and through the holes 83. They next flow in the inlet chamber 111, then penetrate the heat exchanger 5. They cede part of their heat energy to the heat transfer fluid inside the heat exchanger 5, and leave the latter to penetrate the outlet chamber 115. They next pass through the cutoff orifice 123, return to the internal volume of the cover 49, downstream from the opening 61, and leave the body 29 through the second orifice 41.

In the short-circuit position, the valve 31 closes off the cutoff orifice 123.

The opening 61, conversely, is freed. The exhaust gases penetrating the body through the first orifice 39 flow in the circulation channel defined by the flow guide 65 up to the opening 61. They pass through the opening 61 and flow directly up to the second orifice 41.

A fifth embodiment of the invention will now be described in reference to FIGS. 14 and 15.

Only the differences between this fifth embodiment and the fourth will be described below. Identical elements, or elements performing the same functions, will be designated using the same references in both embodiments.

In the fifth embodiment, the flap 31 is movable relative to the body 29 around a rotation axis substantially perpendicular to the or each central axis X.

Furthermore, the direct circulation passage of the exhaust gases and the indirect passage are superimposed along the or one of the central axes X.

In the illustrated example, the direct passage is arranged in the immediate vicinity of the outlet 20. The indirect passage, in which the heat exchanger 5 is housed, is offset axially at a distance from the outlet 20. The direct passage and the indirect passage are separated from one another by an intermediate partition 145 substantially perpendicular to the axis X.

Figure 14:
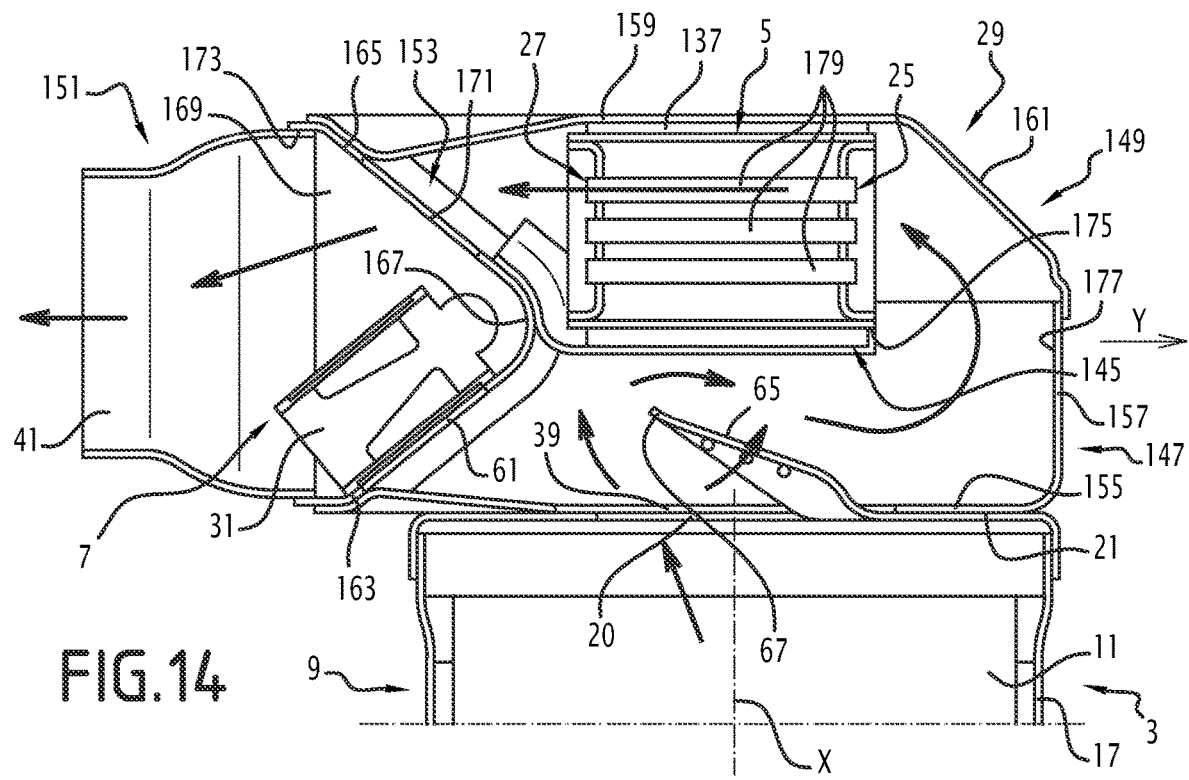
FIGS. 14 and 15 illustrate a fifth embodiment of the invention.
Figure 15:
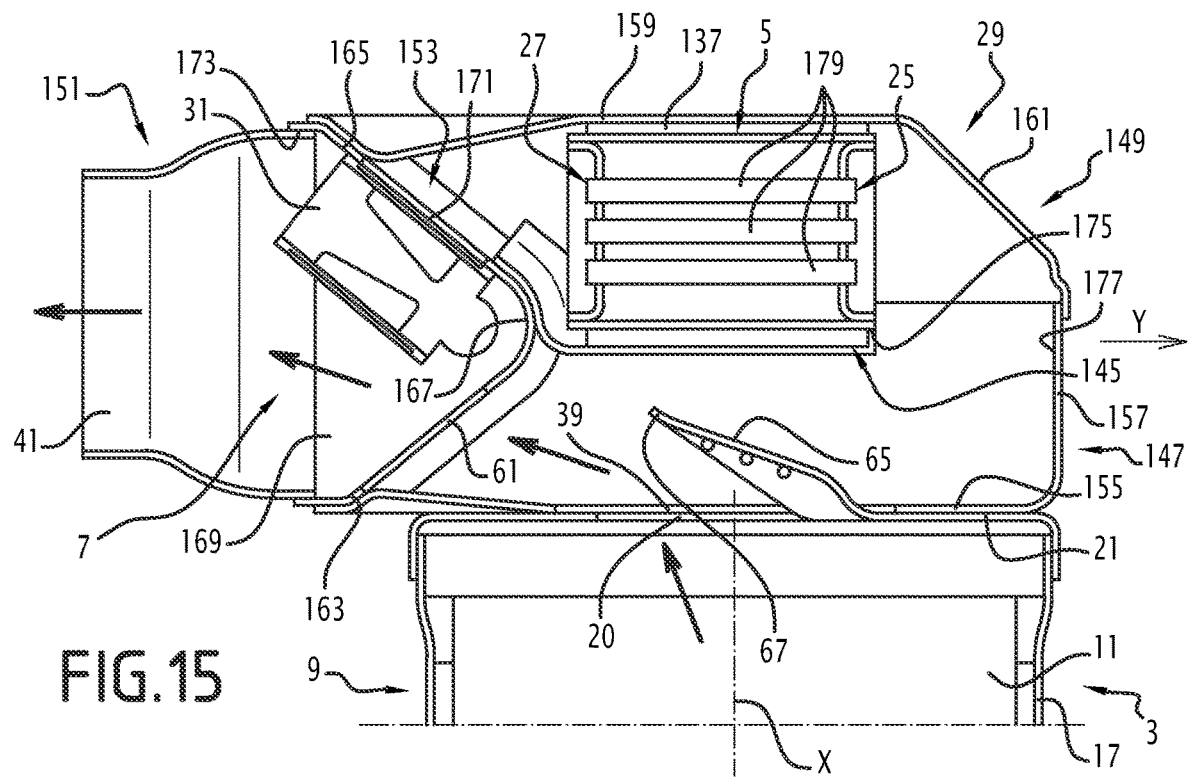

In the exemplary embodiment shown in FIGS. 14 and 15, aside from the intermediate partition 145, the body 29 includes a lower half-shell 147, an upper half-shell 149, an outlet cone 151 and a frame 153 on which the flap 31 is articulated.

The lower half-shell 147 has a bottom 155 surrounded by a lower flanged edge 157. The first orifice 39 is cut into the lower bottom 155. The lower bottom 155 is pressed against the downstream end part 17 of the outer enclosure 9 of the purification member 3. More specifically, the lower bottom 155 is pressed against the bottom 21 of the downstream end part.

The upper half-shell 149 includes an upper bottom 159, surrounded by an upper flanged edge 161. The free edge of the lower flanged edge 157 is engaged in the free edge of the flanged edge 161 and is tightly welded thereon.

The bracket 153 is generally corner-shaped.

More specifically, it includes a lower plate 163 and an upper plate 165, extending in respective planes forming an angle of between 45 and 105° relative to one another. The lower and upper plates 163, 165 are connected to one another by a bowed part 167. The plates 163 and 165 are parallel to the rotation axis of the flap. In the illustrated example, the lower and upper plates 163 and 165 converge toward one another, i.e., converge toward the bowed part 167, along a transverse direction Y perpendicular to both the rotation axis and the central axis X.

The lower and upper plates 163 and 165 are also connected to one another by two end plates 169, which are substantially perpendicular to the rotation axis. In the example, the plates 169 have a triangular shape. The plates 169 support the rotational guide bearings of the flap 31.

The opening 61 is cut out in the lower plate 163. An intermediate opening 171 is cut out in the upper plate 165. The flap 31 is placed in the volume defined between the plates 169, the lower plate 163 and the upper plate 165. In the heat exchange position, shown in FIG. 14, the flap 31 closes off the opening 61. In the short-circuit position, the flap 31 closes off the intermediate opening 171, as shown in FIG. 15.

The opening 61 and the first orifice 39 preferably extend in respective planes forming an angle between them of between 30° and 60°, which is equal to 45° in the illustrated example.

The plates 169, the lower plate 163 and the upper plate 165 define, opposite the bowed part 169, an outlet opening 173, in which the outlet cone 151 is nested. The second outlet 41 is delimited by the end of this cone opposite the frame 153. The cone 151 is tightly welded on the frame 153.

The lower and upper flanged edges 157, 161 have interruptions opposite one another, the frame 153 being pushed in between the half-shells through these interruptions. The outlet opening 173 is located substantially in line with the interruptions. Conversely, the bowed part 167 is pushed in inside the volume defined by the lower and upper half-shells. The end plates 169 are pressed against the zones of the lower and upper flanged edges adjoining the interruptions.

The intermediate plate 145, at a transverse edge, is welded against the bowed part 167. It extends transversely from the bowed part 167. Its opposite transverse end 175 is located transversely distant from the flanged edges 157 and 161.

In the illustrated example, one thus creates, between the transverse end 175 and the flanged edge 157, an aperture 177 through which the direct circulation passage communicates with the indirect passage.

The heat exchanger 5 is placed in the indirect passage, between the intermediate partition 145 and the upper bottom 159. The tubes 179 of the heat exchanger, traveled through by the exhaust gases, extend transversely.

In the exemplary embodiment illustrated in FIGS. 14 and 15, the downstream end 67 of the flow guide 65 stops further from the opening 61 than in the other embodiments. Thus, the gap 71 separating the downstream end 67 from the lower plate 163 has a large width.

According to one advantageous arrangement shown in FIGS. 14 and 15, the flow guide 65 is integral with the bottom 21. It is for example obtained by stamping of the bottom 21. It protrudes inside the body 29 through the first orifice 39.

As illustrated in FIG. 14, in the heat exchange position of the flap 31, the exhaust gases penetrate inside the body 29 through the first orifice 39. They are channeled by the flow guide 65 up to the gap 71. Part of the exhaust gases passes through the flow guide via the holes 83.

The exhaust gases then circulate transversely from the gap 71, up to the opening 177. They penetrate inside the indirect passage through the opening 177. They then circulate transversely through the heat exchanger 5, and pass through the intermediate opening 171. They next circulate in the outlet cone 151 up to the second orifice 41.

When the flap 31 is in the short-circuit position, the exhaust gases penetrate inside the internal volume of the body 29 through the first orifice 39, and are channeled by the flow guide 65 up to the opening 61. After having passed through the opening 61, they travel through the outlet cone 151 and leave the body 29 through the second orifice 41.

This fifth embodiment has multiple advantages.

Due to the orientation of the rotation axis of the flap, the actuator driving the rotation of the flap relative to the body 29 can be arranged on the side of the body 29, and not axially in the extension of the body 29 like in the first embodiment. The rod 37 driving the flap 31 can come out either on one side of the body 39 or on the opposite side.

Because the flow guide 65 is integrated into the bottom 21, the device includes one part less than in the fourth embodiment.

The axis of the outlet cone 151 is able to be oriented as needed, which is not possible in the fourth embodiment.

The frame 153, supporting the rotation bearings of the flap 31, is a rigid structure, independent of the lower and upper half-shells.

The rotation angle making it possible to take the flap 31 from its heat exchange position to its short-circuit position is small.

The maneuvering torque is reduced, due to the fact that the radial width of the flap is reduced in favor of its axial width. Thus, the lever arm of the force from the gases is reduced, and therefore the maneuvering and maintaining torque is also reduced.

The frame 153 is assembled to the outlet cone 151 by peripheral welding, making it possible to avoid any leaks between these two parts.

In the fifth embodiment, the body 29 has a reduced bulk relative to the fourth embodiment, at least in the axial direction.

Figure 16:
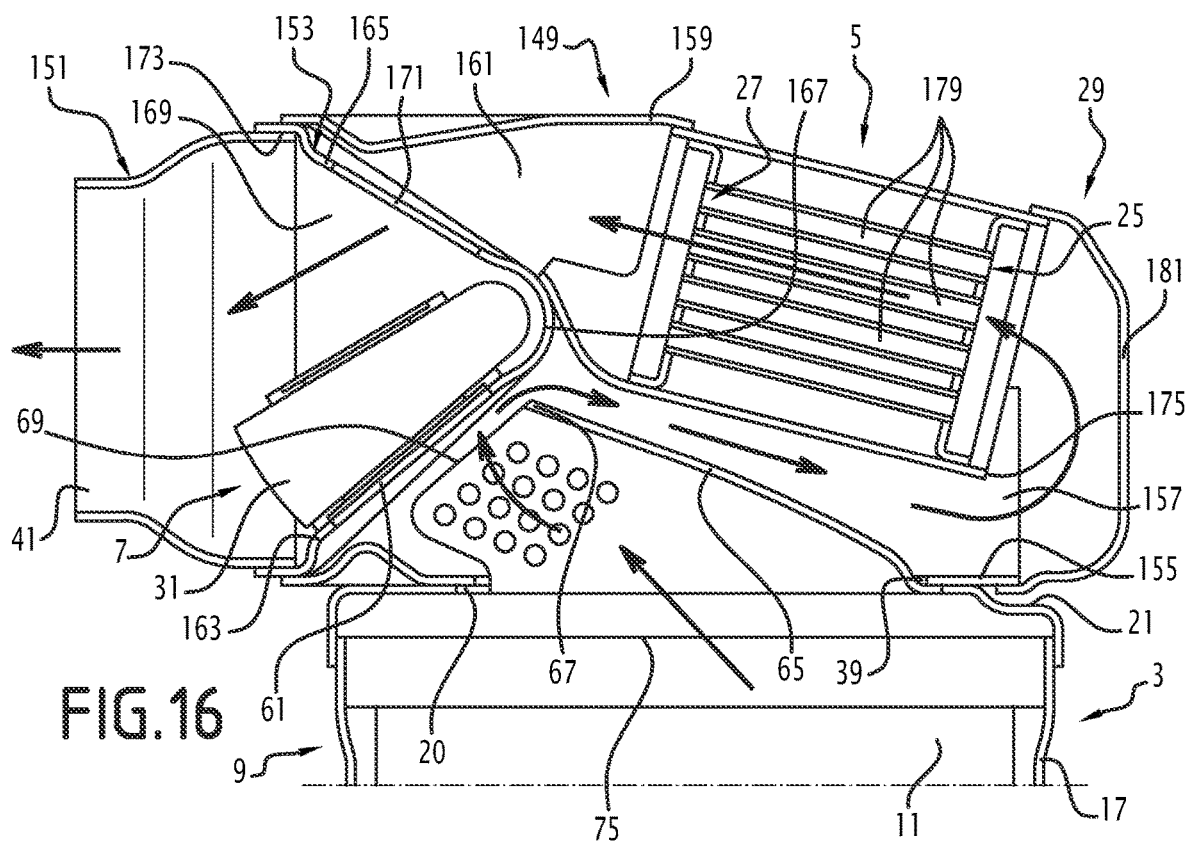
FIGS. 16 and 17 illustrate a variant of the fifth embodiment of the invention.
Figure 17:
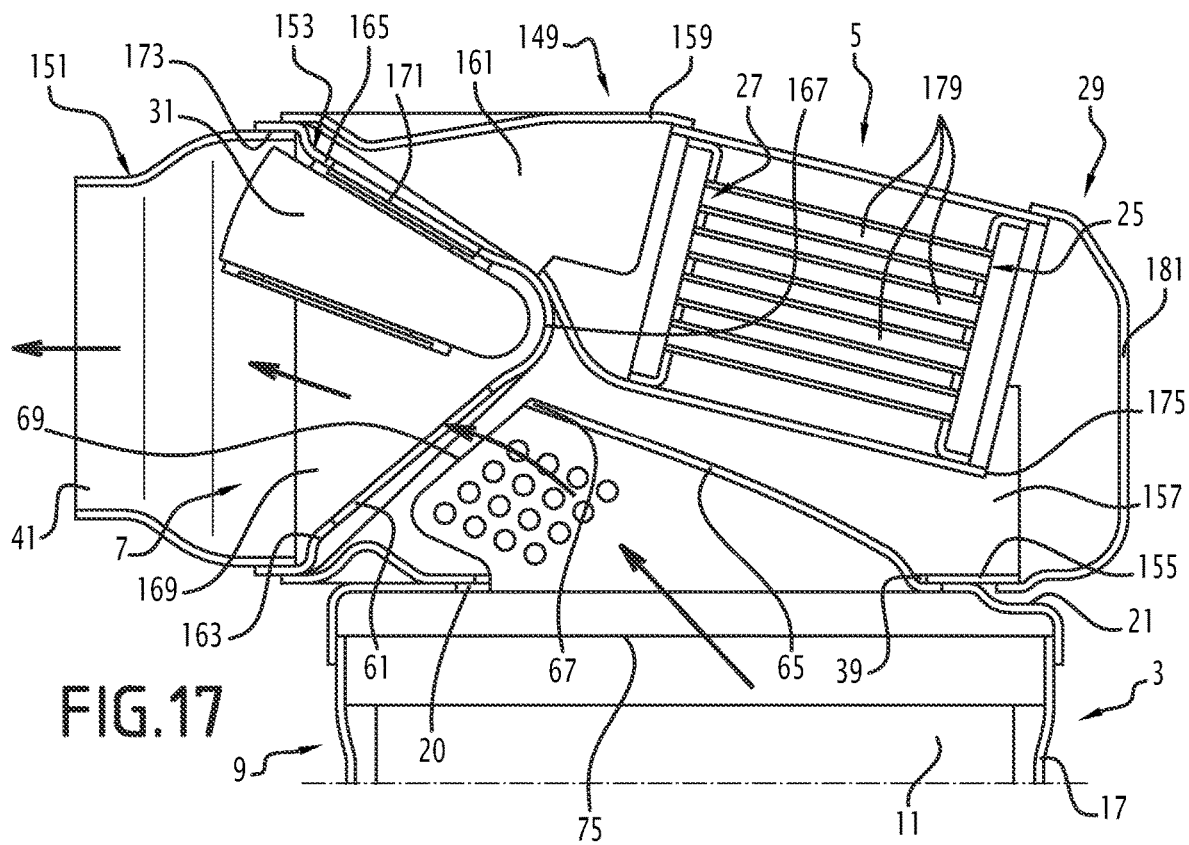

Several variants of the fifth embodiment will now be described, in reference to FIGS. 16 and 17.

Only the points by which each variant differs from the embodiment of FIGS. 14 and 15 will be outlined below. Identical elements or elements performing the same functions will be designated using the same references.

These variants can be implemented independently of one another, or in combination.

The flow guide 65 is longer than in the exemplary embodiment of FIGS. 14 and 15. It extends practically up to the lower plate 163, such that the gap 71 has a reduced width.

Furthermore, the flow guide 65 is not integral with the bottom 21. It is attached either on the bottom 21 or on the lower half-shell 147.

The heat exchanger 5 is arranged in a tilted position, as shown in the figures. Thus, the tubes 179 are not oriented transversely, but form an angle with the transverse direction, typically of between 10° and 30°.

The upstream end of each tube 179 is, along the central axis X, relatively closer to the outlet 20 than the downstream end of the tube.

The tilted position makes it possible to reduce the volume of the body, and the exchange surface upstream from the exchanger. It therefore makes it possible to minimize the heat losses and the thermal inertia, and to minimize the section variations of the channel between the gap and the inlet of the exchanger.

The outer enclosure of the heat exchanger 5 defines the intermediate partition 175, and a part of the upper bottom 159. As a result, the web 137 is eliminated.

At the transverse end of the body 29 opposite the cone 151, the lower flanged edge 157 and the upper flanged edge 161 are replaced by a rear lid 181. This rear lid 181 is tightly welded on the lower half-shell 147 and on the outer enclosure of the heat exchanger 5. The presence of the lid makes it possible to facilitate the stamping of the two half-shells 147 and 149.

The rear lid 181 has a shape suitable for optimizing the performance of the heat exchanger 5, by optimizing the distribution of the exhaust gases in the tubes 179 of the heat exchanger. The distribution is optimized in both directions, i.e., parallel to the central axis X, and parallel to the rotation axis of the flap. Such an optimization is possible due to the incline of the heat exchanger.

Advantageously, the heat exchanger 5 includes a smaller number of tubes. These tubes are wider in the direction of the largest transverse dimension of the cross-section of the exchanger. In the illustrated example, the exchanger 5 includes four tubes 179, superimposed on one another, each tube 179 extending over the entire width of the heat exchanger 179, this width being considered parallel to the rotation axis of the flap.

Irrespective of the embodiments or variants of the invention, the flow guide 65 is preferably separate from the body 29.

The invention claimed is:

1. An exhaust gas treatment device for a vehicle, the device comprising:
    at least one exhaust gas purification member, the at least one or each exhaust gas purification member including an outer enclosure, an exhaust gas purification substrate housed in the outer enclosure and having a central axis, the or at least one of the outer enclosures having a purification member outlet for the exhaust gases;
    a heat exchanger including an exhaust gas circulation side provided with an exchanger inlet for the exhaust gases and an exchanger outlet for the exhaust gases, the heat exchanger being axially located beyond an axial end of the exhaust gas purification substrate of the at least one or each exhaust gas purification member;
    a body delimiting an inner volume;
    a valve including a flap arranged in the internal volume of the body and movable relative to the body;
    wherein the exchanger inlet and the exchanger outlet open into the internal volume;
    at least 45% of a body volume of the body is in a virtual space located in an axial extension of the one or more exhaust gas purification substrate(s), the virtual space comprising, for the at least one or each exhaust gas purification member, a cylinder coaxial to the central axis of the exhaust gas purification substrate of said exhaust gas purification member and having a straight section perpendicular to said central axis identical to an orthogonal projection of the exhaust gas purification substrate of said exhaust gas purification member in a plane perpendicular to said central axis;
    the body includes at least one first orifice in fluid communication with the purification member outlet, and a second orifice defining an outlet for the exhaust gases;

wherein the flap is movable at least between a short-circuit position in which the flap frees a direct passage for the exhaust gases from the first orifice to the second orifice without going through the heat exchanger, and a heat exchange position in which the flap closes off an opening and intersects the direct passage, the device comprising a flow guide delimiting a circulation channel for the exhaust gases from the first orifice toward the opening; and wherein the opening is defined by a peripheral edge, the flow guide having a downstream end defining a downstream opening by which the exhaust gases leave the circulation channel, the downstream end being separated from the peripheral edge of the opening by a gap.

2. The device according to claim 1, wherein the first orifice and the exchanger inlet extend in respective planes forming an angle relative to one another of between 30° and 120°.

3. The device according to claim 1, wherein the first orifice and the opening extend in respective planes forming an angle relative to one another of between 30° and 120°.

4. The device according to claim 1, wherein the downstream end, considered projected in a plane including the opening, fits inside the opening, the projection being along a direction parallel to the plane in which the first orifice fits and is in a plane perpendicular both to the first orifice and to the opening.

5. The device according to claim 1, wherein the flow guide has a passage section decreasing from the first orifice toward the opening.

6. The device according to claim 1, wherein the device has an indirect passage for the exhaust gases from the first orifice to the second orifice, passing through the heat exchanger, the direct passage and the indirect passage are offset axially with respect to one another along the or one of the central axes.

7. The device according to claim 1, wherein the first and second orifices extend in respective planes forming an angle relative to one another of between 30° and 120°.

8. The device according to claim 1, wherein at least 30% of a heat exchanger volume of the heat exchanger is in the virtual space.

9. The device according to claim 1, wherein the heat exchanger is housed in the internal volume of the body.

10. The device according to claim 1, wherein the heat exchanger is arranged outside the body, the body having third and fourth orifices in fluid communication with the exchanger inlet and with the exchanger outlet.

11. The device according to claim 1, wherein the flap is movable relative to the body around a rotation axis substantially perpendicular to the or each central axis.

12. The device according to claim 1, wherein the flow guide is separate from the body.

13. The device according to claim 1, wherein the outer enclosure is closed on a downstream side by a bottom in which the purification member outlet is arranged.

14. A vehicle exhaust line comprising:
a main line on which a treatment device according to claim 1 is inserted;
a line for recycling exhaust gases toward an air intake of an engine; and wherein
the circulation side for the exhaust gases of the heat exchanger comprises an additional outlet in fluid communication with the line for recycling the exhaust gases.

* * * * *